May 17, 1932. H. L. BARNHOLDT 1,858,261
INCLOSED FAN COOLED MOTOR
Filed Jan. 23, 1930 2 Sheets-Sheet 1
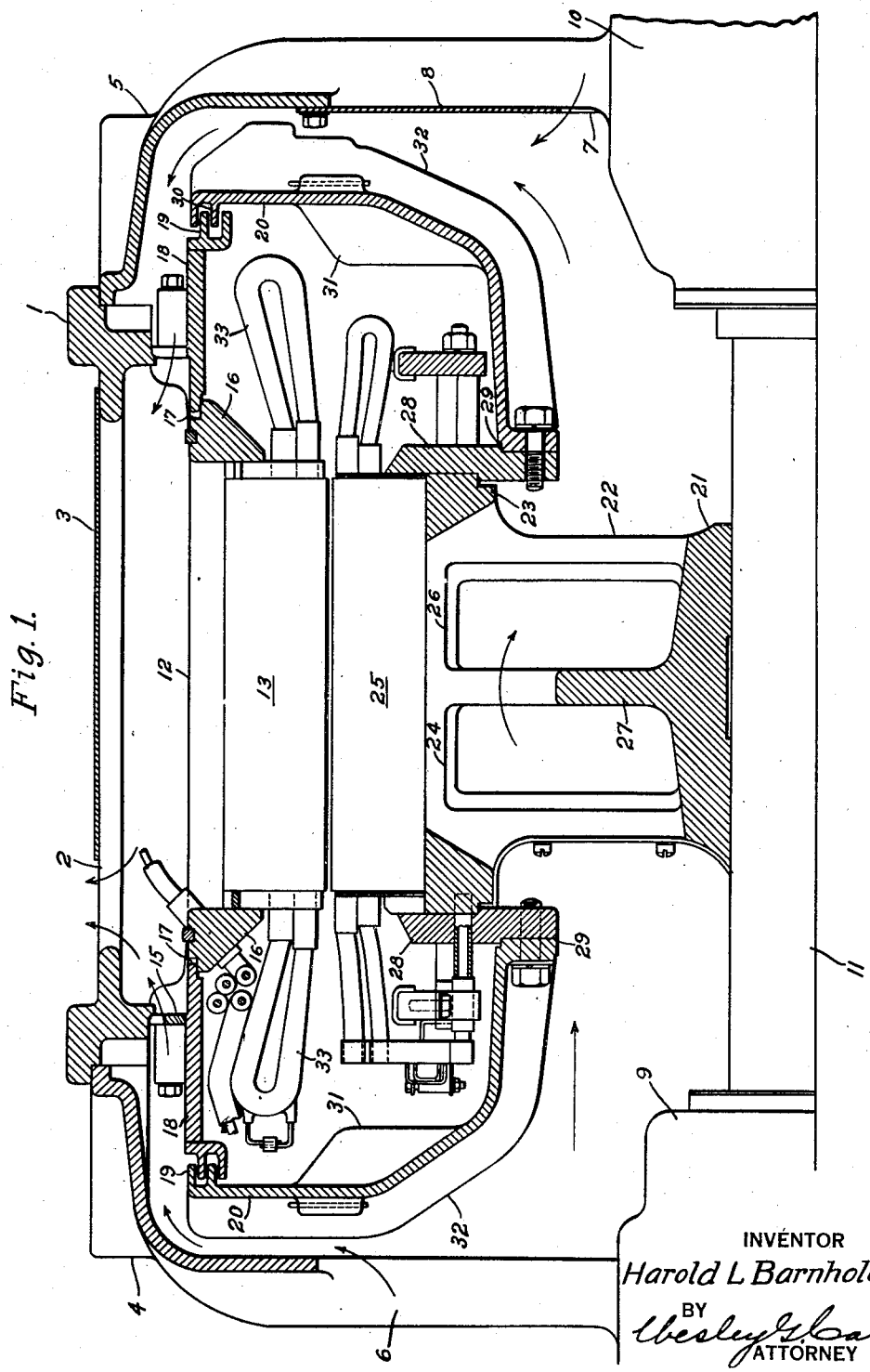
INVENTOR
Harold L Barnholdt.
BY
Wesley I Carr
ATTORNEY

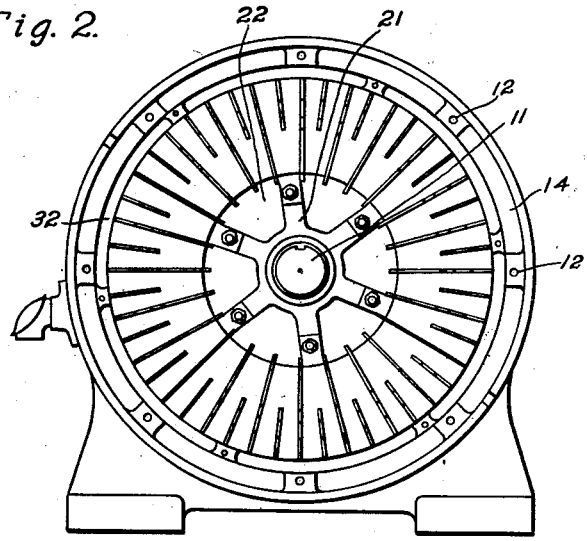
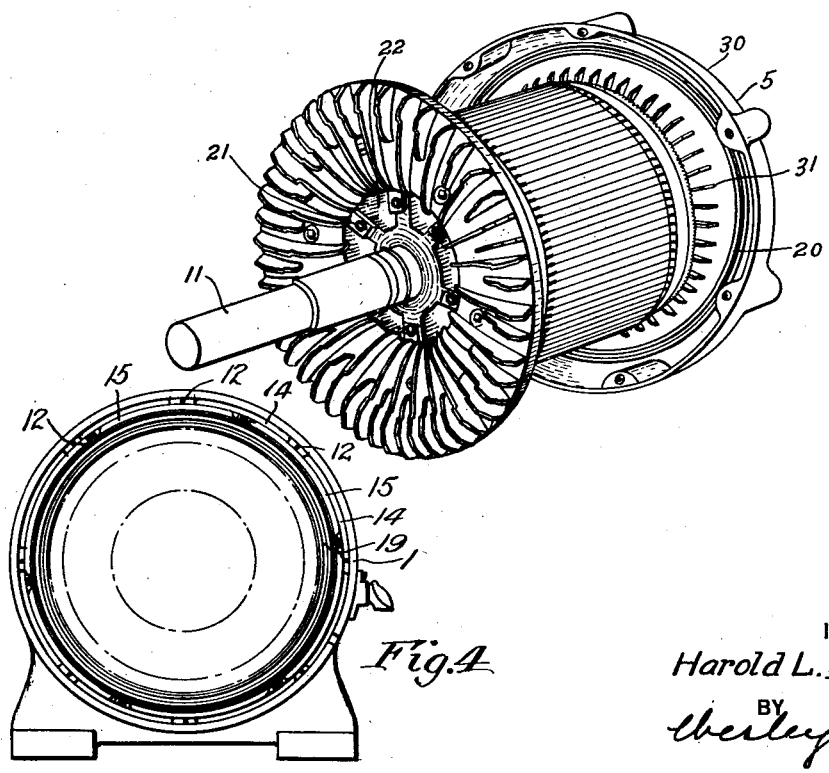

Patented May 17, 1932

1,858,261

UNITED STATES PATENT OFFICE

HAROLD L. BARNHOLDT, OF PITTSBURGH, PENNSYLVANIA, ASSIGNOR TO WESTINGHOUSE ELECTRIC & MANUFACTURING COMPANY, A CORPORATION OF PENNSYLVANIA

INCLOSED FAN-COOLED MOTOR

Application filed January 23, 1930. Serial No. 422,777.

My invention relates to inclosed fan-cooled motors and more particularly to improved cooling means for such motors.

My invention further relates to improved closures for such motors.

Prior to my invention, there had been much difficulty in cooling motors of the inclosed type. Because of this difficulty, the capacity of inclosed motors has been limited to about 40 H. P. However, by the use of my invention, the capacity of such inclosed machines may be safely increased to about 300 H. P. without danger of serious overheating.

Inclosed motors are extensively used in locations where the air about them is apt to be charged with foreign matter, such as dust or lint or even water vapor, which will settle in the motor and eventually disable it, or in locations exposed to corrosive vapors, such as acid or alkali fumes, or in locations where the air is liable to be charged with explosive substances, such as mine damp and coal or grain dust or other substances liable to be ignited by sparking at the commutators or collector rings.

However, before my invention, the serious capacity limitation of inclosed motors has prevented installation in many places where they were otherwise desirable. My invention removes the capacity limitation and permits the use of safe inclosed motors in a much greater range of application.

It is an object of my invention to provide an improved fan-cooled inclosed motor.

It is a further object of my invention to provide an improved cooling system for such motors.

It is a further object of my invention to provide an improved closure for an inclosed motor.

Other objects and advantages of my invention will be apparent from the specification and the drawings annexed thereto, in which, Figure 1 is a sectional elevation of a motor comprising my invention;

Fig. 2 is an end view of a motor, an end bell being removed;

Fig. 3 is a perspective view of a rotor;

Fig. 4 is an end view of the housing, end bells being removed.

My improved machine comprises an outer frame or casing 1 having air ports 2 in the periphery thereof, the air ports being controlled by closures 3 which may be plates suitably attached to the casing or may be cast integral with the casing. The casing is provided with end bells 4 and 5 having air passages 6 and 7, respectively, the air passages 7 being provided with a partial closure plate 8. The bells are further provided with bearings 9 and 10 in which is journalled the shaft 11 carrying the rotating parts of the machine.

The casing 1 is provided with ribs 12 to space the stator core 13 from the frame 1 to provide passages 14 between the frame and stator core and in communication with the punchings forming the core, these passages having means 15 to paritally close them at one end for the purpose of regulating their air capacity. The core is held in place by end rings 16 which are provided with seats 17 to support end-closure rings 18 which are secured, in substantially air-tight relation, to the ring 18 and in spaced relation to the frame. The end-closure rings 18 are provided with grooves 19 on their free ends to cooperate with closure plates 20, presently to be described.

The rotor of my machine comprises a skeletonized spider 21 having air passages 22 therethrough. The outer periphery of the spider is provided with rings 23 connected by ribs 24 to provide a seat for the punchings constituting the core 25, the spaces 26 between the ribs being in communication with the air passages 22 which are provided with a baffle 27 to divert cooling air into contact with the parts of the punchings exposed between the ribs of the spider. The core is held in place on the spider by end rings 28 secured to it. The end rings 28 are extended downward to provide seats 29 to receive the closure plates 20 which, in cooperation with the end rings 18, provide a substantially dust-proof inclosure for the windings of both stator and rotor, as well as the commutator or collector rings and other connections to the windings.

The closure plates 20 are provided, at their external edges, with grooved surfaces 30 to cooperate with the grooved surfaces 19 on the end closure ring 18 to make a labyrinth like joint or seal. The closure plate 20 is further provided with impeller vanes 31 on the interior surface and also impeller vanes 32 on the exterior surfaces thereof.

The impeller blades are preferably integral with the closure plate but may be welded or brazed thereto in order to provide a good heat-conducting union between the vanes and the closure plate whereby the surface of the vanes may be added to the surface of the closure plate to increase the heat-radiating capacity of the latter.

The inner impeller vanes agitate the air inclosed by the end-closure members and surrounding the loops 33 of the windings. This agitation conveys the heat from the windings to the closure members, and the closure plate 20, having the impeller vanes 31 in good heat-conducting union therewith, presents a large absorption surface to absorb heat from the inclosed air.

The exterior impeller vanes 32 act as a centrifugal pump to force the air in the outer casing out through the passages 14 provided between the outer frame and the stator core and draws fresh cooling air into the casing. The flow of air at this end of the motor will be regulated to provide only sufficient air flow to cool the bearing at this end of the motor.

The operation of my device is as follows: Upon power being supplied to the motor and the rotor beginning to rotate, the exterior impeller vanes draw air into the motor and across the closure plates. Also, the impeller vanes on the interior of the closure plates will agitate the air inclosed in the motor and absorb heat produced in its windings. The heat will be transmitted from the obsorption surface to the outer or radiating surface of the closure means, which is substantially increased in area by the construction of the impeller vanes. The outer surface of the closure plate and impeller vanes constitutes a radiating surface to radiate the heat from the motor to the cooling fluid. The cooling fluid then passes, between the frame and the stator, to the discharge ports in the periphery of the motor frame. Also, sufficient air will be drawn past the bearing in the closed end of the motor to dissipate any heat generated by friction in it.

I do not wish to be restricted to the specific structural details, or arrangement of parts herein set forth, as various modifications thereof may be made without departing from the spirit and scope of my invention. I desire, therefore, that only such limitations shall be imposed as are indicated in the appended claims.

I claim as my invention:

1. A cooling system for an inclosed dynamo-electric machine having a rotor and a stator in a casing and bearings at the end of said casing which comprises air ports in the periphery of the machine casing, air passages between the machine casing and the stator of the machine and in communication with the air ports in the periphery of the frame, means to regulate the air capacity at the opposite ends of the passages, air ports of sufficient capacity to admit cooling air for the machine at one end of the casing and ports of small capacity at the opposite end of the casing, said ports being in proximity to the bearing to cause the cooling air to also cool the bearing, air passages through the rotor of the machine, closure means to exclude the cooling air from the windings of the machine, means on said closure means to exclude dirt from the windings, means on said closure means to radiate heat to the cooling air, and impeller means to cause the flow of cooling air.

2. A casing for a dynamo-electric machine comprising a frame having air-outlet ports therein, and end bells for the frame, said end bells having air-inlet ports therein, the air-inlet ports of one bell being of greater capacity than the air-inlet ports of the opposite bell.

3. A rotor for an inclosed dynamo-electric machine comprising a spider, a core structure supported on the spider, air passages through the spider and in communication with portions of the core, a baffle in said spider to deflect air passing through said air passages into contact with the core structure.

4. An inclosed dynamo-electric machine comprising a frame having air ports therein, a stator having air passages across the same, end bells for the frame having air ports therein, the air ports in one end bell being of different capacity than the air ports of the opposite end bell, a rotor comprising a skeletonized spider and a laminated rotor core supported thereby, passages through said spider having portions open to said laminated core, a closure member attached to said rotor and in dust-excluding relationship to the stator, impeller vanes on said closure member to cause a flow of cooling air through said machine, and means in said spider to deflect the cooling air into contact with the laminated core.

5. An inclosed motor comprising an outer frame provided with air-outlet passages in its periphery, end bells for said frame having air-inlet passages, means to partially close the air passages of one of said end bells, a stator, air passages across the stator, means to vary the air flow through the opposite ends of the passages across the stator, a rotor having air passages therethrough, a closure element for said rotor, said closure element being provided with impeller blades on its outer surface.

6. An inclosed motor comprising an outer frame provided with air-outlet passages in its periphery, closure bells for each end of the frame, one of said bells being provided with large air-inlet openings and the other with relatively small air-inlet openings, a stator spaced from the frame to provide air passages between the stator and the frame, a rotor having air passages therethrough, means to vary the flow of air at opposite ends of the passages between the frame and stator, means to exclude the cooling air from the winding of the motor comprising a cover plate attached to the rotor, said cover plate having impeller vanes on its surface.

7. An inclosed dynamo-electric machine comprising rotary and stationary elements, a casing substantially open at one end and partially closed at the other end and having an opening in its outer periphery, a stator spaced from the casing to provide air passages between the casing and the stator and means to partially close the air passages at the end nearest the open end of the casing, a rotor provided with air passages therethrough, closure members to protect the windings of both rotary and stationary elements comprising a cover ring at each end of the stator and a cover plate at each end of the rotor, said cover ring and cover plate having a dust-excluding joint, said cover plate being provided with radially disposed impeller blades in good heat-conducting relation to the cover plate.

8. An inclosed dynamo-electric machine comprising an outer frame carrying a stator and means to hold the stator in spaced relation from the outer frame, said frame being partially closed at one end and substantially open at the other, means to partially close the space between the frame and the stator at that end of the frame which is substantially open, a rotor journaled in said outer frame comprising a skeleton-like spider carrying a core and its windings, closure elements for the machine comprising a cover ring connected to the stator in spaced relation to the frame and a cover plate connected to the rotor in spaced relation to the spider and in cooperating relationship to the cover ring, said cover plate being provided, on both inner and outer surfaces, with radially disposed impeller vanes.

9. A rotor for an inclosed dynamo-electric machine comprising a spider having peripheral openings therein, a core section on said spider, means to retain said core section in place, means to cause air flow through said spider and means to divert said air flow into contact with parts of said core section.

10. A cooling system, for an inclosed dynamo-electric machine having a stator and a rotor in a casing, end bells secured to said casing and having bearings for supporting the rotor, said end bells having air-inlet ports therein in proximity to the bearings so that the air flowing through said ports cools said bearings, the air-inlet ports in one end bell being of different capacity from the air-inlet ports of the other, the smaller ports admitting sufficient air to cool the bearings adjacent thereto and the larger ports admitting cooling air for the machine, air ducts for conducting cooling air through the rotor, closure means for excluding the cooling-air from the windings, means on said closures for abstracting heat from the windings and for radiating the same to the cooling air, discharge ports in the casing, air-passages between the stator and casing communicating with said ports and impeller means for causing a flow of air through the machine.

In testimony whereof, I have hereunto subscribed my name this 9th day of January, 1930.

H. L. BARNHOLDT.